United States Patent [19]
Baxter et al.

[11] Patent Number: 5,633,681
[45] Date of Patent: May 27, 1997

[54] ELECTRICALLY CONTROLLED CAMERA POSITIONING SYSTEM

[75] Inventors: Larry K. Baxter, Gloucester; Daniel R. Phelps, Lynn; Anthony M. Duys, Newburyport, all of Mass.; Frank Labuski, Wells, Me.

[73] Assignee: Picturetel Corporation, Danvers, Mass.

[21] Appl. No.: 398,546

[22] Filed: Mar. 6, 1995

[51] Int. Cl.$^6$ .................................................. H04N 5/225
[52] U.S. Cl. ........................................ 348/373; 348/211
[58] Field of Search ................................ 348/211, 143, 348/151, 373, 15; 248/371, 183

[56] References Cited

U.S. PATENT DOCUMENTS

| | | | |
|---|---|---|---|
| 3,984,628 | 10/1976 | Sharp | 348/211 |
| 4,937,675 | 6/1990 | Starceski et al. | 348/373 |
| 5,049,988 | 9/1991 | Sefton et al. | 348/143 |
| 5,128,770 | 7/1992 | Inana et al. | 348/211 |

*Primary Examiner*—Wendy Garber
*Attorney, Agent, or Firm*—Fish & Richardson, P.C.

[57] ABSTRACT

A camera positioning system for rotating a video camera about a rotation axis. The system includes a camera platform to which the camera is rotatably attached; a motor mounted to a base for driving the camera platform to effect rotation of the platform about the axis and relative to the base; a drive for coupling the motor to the camera platform; an electrically driven capacitive sensor assembly for generating electrical position signals for determining a rotational position of the camera platform relative to the base; and a feedback control circuit for using the position signals from the capacitive sensor assembly to control rotational positioning of the motor, resulting in rotating the camera to a desired camera position. The capacitive sensor has a conductive guard plate which helps immunize the capacitive sensor assembly from noise and from ground potentials. The rotation axis can be horizontal or vertical with the camera rotated to effect pan or tilt respectively.

20 Claims, 5 Drawing Sheets

ELECTRICALLY CONTROLLED CAMERA POSITIONING SYSTEM

BACKGROUND OF THE INVENTION

The invention relates generally to camera positioning systems, and more particularly, to a method and apparatus for controlling the pan and/or tilt of a video camera in a videoconferencing environment.

Current videoconferencing systems, such as those manufactured by PictureTel Corporation, can include a moveable video camera which is controlled from a remote keypad. The remote keypad, in addition to providing both pan and tilt incremental controls, includes so-called presets which enable the user to store fixed positions of the camera for later recall. Accordingly, at later times during a videoconference, a single button commands the videoconferencing system to move the camera to a predetermined location.

Current technology, for high resolution systems, is relatively expensive. These systems can be open loop or closed loop, and can include varying control devices including optical striped encoders, Hall effect transducers, and other position sensing devices.

Capacitive sensors, which have been used in various specialized circuits, have been employed as rotary and linear position transducers in varying applications. Capacitive transducers, however, have not been used in instances where high resolution and low cost are the key requirements. Accordingly, they have not been used for controlling the pan and tilt of cameras in a videoconferencing environment.

It is therefore an object of the invention to provide a camera positioning system which is inexpensive, accurate, linear, and capable of high repeatability for absolute positioning. Other objects of the invention are a camera positioning system which is relatively immune from noise and grounding effects, and which has long life, high reliability, and good frequency response.

SUMMARY OF THE INVENTION

The invention relates to a camera positioning system for rotating a video camera about one or two rotation axes. The invention features a camera platform to which the camera is fixedly attached for axial rotation about the axis; a motor mounted to a base for driving the camera platform to effect rotation of the platform about the axis and relative to the base; a drive for coupling the motor to the camera platform to effect rotation of the platform about the rotation axis; an electrically driven capacitive sensor assembly for generating electrical position signals for determining a rotational position of the camera platform relative to the base; and a feedback control circuit for using the position signals from the capacitive sensor assembly to control rotational positioning of the motor, resulting in rotating the camera to a desired camera position.

In particular embodiments of the invention, the system uses a friction drive including a friction drive surface coupled to a friction driven surface; the drive surface being rotatably attached to an output shaft of the motor and the driven surface being attached to the camera platform for movement therewith. The friction drive surface, in accordance with the invention, is a rubber tire having 0.15 inch outer diameter and the driven surface is a disk having a 6 inch outer diameter, for providing a 40:1 gear ratio.

The capacitive sensor has a rotor and a pickup sensor mounted in a spaced-apart overlapping configuration. In the illustrated embodiment, one of the rotor or pickup sensor is attached to the camera platform and the other of the rotor or pickup sensor is attached to the base. The capacitive sensor has a conductive guard plate spaced from the pickup on a side of the pickup opposite to that of the rotor, supported by the base. The guard plate helps immunize the capacitive sensor assembly from electrical noise and from ground potentials.

The rotor includes a spiral plate pattern having a first conducting surface and a second conducting surface. The rotational position of the camera platform relative to the base is measured by the amount of overlap between the pickup sensor and each of the conducting surfaces.

In one illustrated embodiment, the position output from the capacitive sensor assembly is insensitive to spacing between the rotor and the pickup sensor. The capacitive sensor assembly has a high impedance, low input capacitance circuit which includes two discrete field-effect transistors connected between the pickup sensor and an amplifier. The capacitance circuit is a voltage measuring circuit.

The sense plates are shaped for enabling the absolute rotational position of the camera to be determined. In particular embodiments of the invention, the capacitive sensor assembly and control circuitry provide a resolution of at least 0.0016° across, preferably, 270° of rotation. The system is capable of 180 degrees of pan in 1 second, 0.5 degrees short term repeatability, 1 degree long term repeatability, 0.007 degree short-term stability, and less than 0.05 degree motion jitter at slow speeds.

The rotation axis can be horizontal with the camera rotated to effect pan and the rotation axis can be vertical with the camera rotated to effect tilt. In the current embodiment both tilt and pan axes are available.

In another embodiment of the invention, a camera positioning system for rotating a video camera about a rotation axis, includes a camera platform to which the camera is fixedly attached for axial rotation about the axis; a motor mounted to a base for driving the camera platform to effect rotation of the platform about the axis and relative to the base; and a friction drive for coupling the motor to the camera platform to effect rotation of the platform about the rotation axis, the friction drive including a friction drive surface coupled to a friction driven surface, the drive surface being rotatably attached to an output shaft of the motor and the driven surface being attached to the camera platform for movement therewith.

In an alternative embodiment of the invention, a camera element positioning system for rotating a rotational camera element about an axis includes a motor for driving the rotational element to effect rotation of the element about the axis; a drive for coupling the motor to the rotational element to effect rotation of the rotational element about the axis; an electrically driven capacitive sensor assembly for generating electrical position signals for determining a rotational position of the rotational element; and a feedback control circuit for using the position signals from the capacitive sensor assembly to control rotational positioning of the motor, resulting in rotating the rotational element to a desired position.

Other objects, features, and advantages of the invention will be apparent from the following description taken together with the drawings in which:

DESCRIPTION OF THE PREFERRED EMBODIMENT

Figure 1:
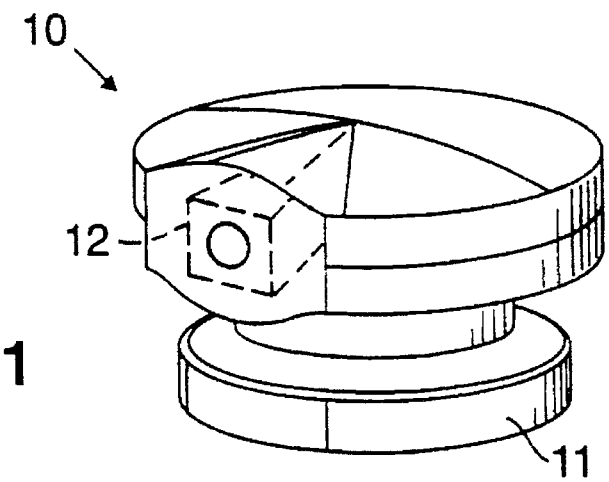
FIG. 1 is a perspective view of the camera positioning system of the invention.

Referring to FIG. 1, a camera positioning system 10, according to the invention, provides for fast, precise, low power panning and tilting of a camera 12. Camera 12 is, for example, a Sony EVI-130. Camera positioning system 10 operates to provide the pan and tilt motion control of camera 12 and houses in its base section 11 the mechanical and electrical elements to effect accurate pan and tilt positioning. Since the pan and tilt mechanisms both operate in similar manners and are functionally independent of each other, only the pan position control will be described in detail herein.

Figure 2:
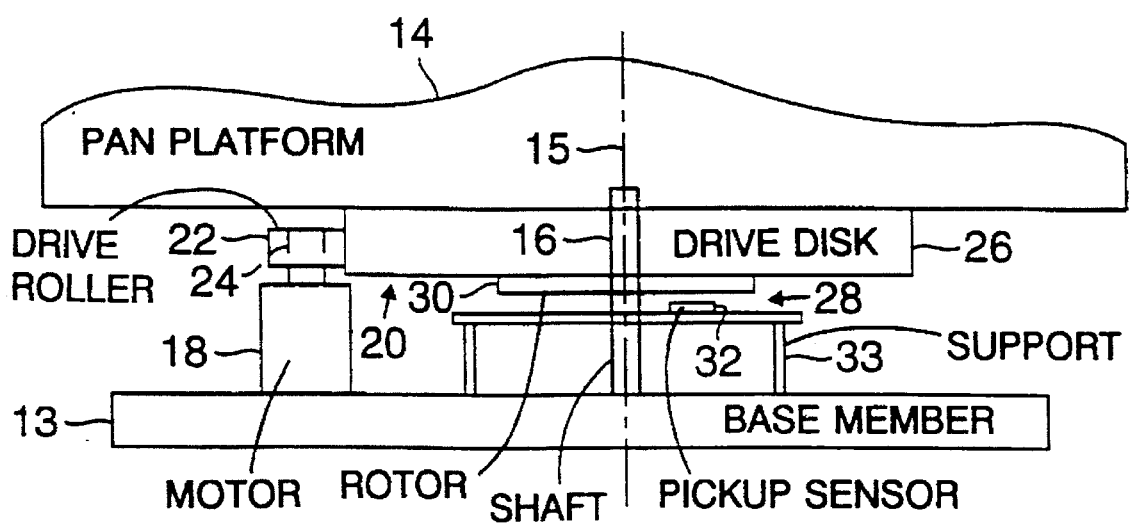
FIG. 2 is a diagrammatic representation of the pan control mechanism of the camera positioning system.

Referring to FIG. 2, the camera (not shown) is fixedly mounted to a pan platform 14 (on which the tilt platform and control are mounted) which is mounted for rotation about a vertical pan axis 15. A shaft 16, coaxial with axis 15 and rotationally secured to a fixed base member 13, supports platform 14 for rotation. A DC motor 18 fixedly mounted to base member 13 has a rotating output shaft 24 and drives pan platform 14 through a friction drive assembly 20 (or alternatively a belt or gear drive). Friction drive assembly 20 includes a drive roller 22, for example, a 0.15" outside diameter rubber tire, attached to the output shaft 24 of motor 18 and coupled to frictionally drive a drive disk 26, for example, a 6" diameter capstan pulley, coaxially attached in a fixed relationship to pan platform 14. Roller 22 and disk 26 provide, in the illustrated embodiment, a 40:1 gear reduction.

A capacitive sensor assembly 28 provides signals which represent the pan position of disk 26, and hence camera 12. Capacitive sensor assembly 28 includes a rotor 30 fixedly and coaxially mounted to disk 26 and a pickup sensor 32 fixed to base 13 by an electrically insulating support 33.

Figure 3:
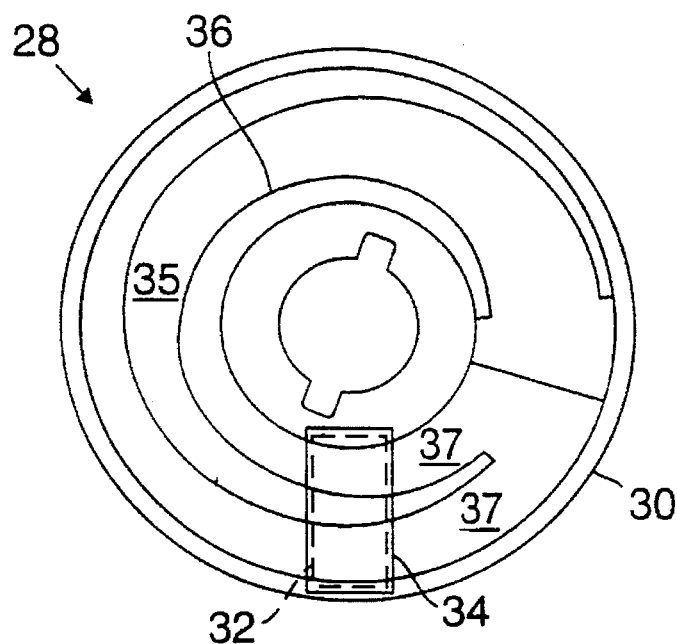
FIG. 3 shows the capacitive sensor assembly for providing position feedback in the camera positioning system.
Figure 3A:
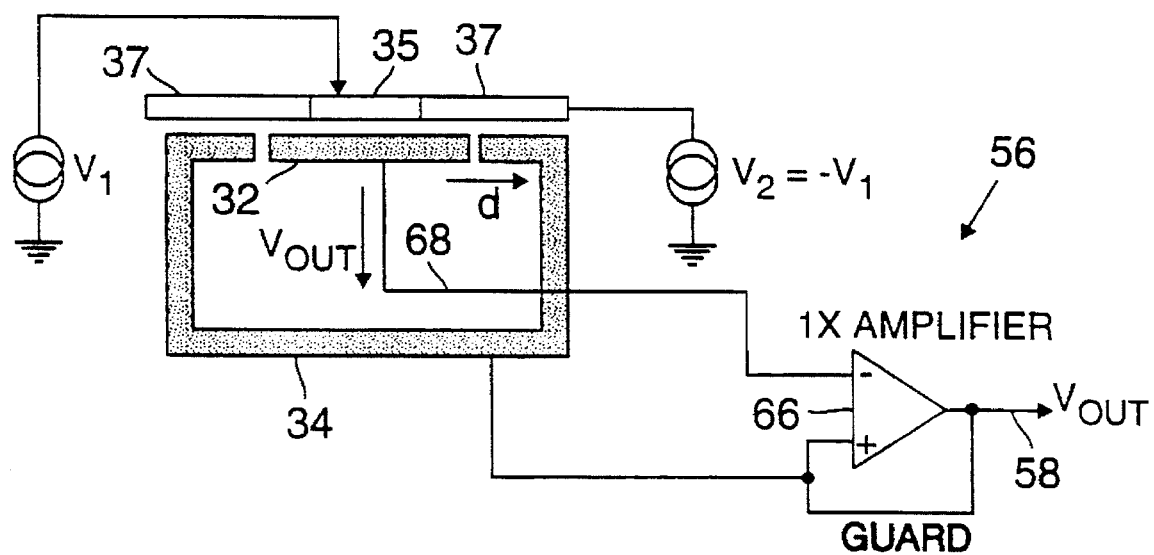
FIG. 3A is a side elevation view of the capacitive sensor assembly of FIG. 3 including associated electronics.

Referring to FIGS. 3 and 3A, pickup sensor 32 of capacitive sensor assembly 28 is shielded from ground potential and noise by a conductive guard plate 34 spaced from and fixedly supported relative to pickup sensor 32. Guard plate 34 can be electrically bootstrapped, as is well known in the art, to provide rejection of power supply voltage change, low frequency noise, and absolute capacitance change. Guard plate 34 is typically larger than pickup sensor 32 and nulls stray capacitance, provided a high gain amplifier is used. A demodulator may be employed to filter and remove noise, as is well known in the field.

Rotor 30 rotates with camera 12 and has a capacitor plate pattern 36 designed to provide good linearity and low spacing sensitivity. The geometry of plate pattern 36 results in slow motion (1°/second) resolution of at least 0.0016° over 270° of panning.

Illustrated pattern 36 includes a first conducting surface coating 35 and a second conducting surface coating 37. The pan position of camera 12 is determined by the amount of overlap between pickup 32 and each of surfaces 35 and 37, that is, the relative capacitor value $C_{13}$ of the capacitor formed by plate 35 and pickup sensor 32, and the capacitor value $C_{23}$ of the capacitor formed by plate 37 and pickup sensor 32. Surfaces 35 and 37 spiral to create pattern 36 such that the voltage output from pickup sensor 32 is linear with respect to the angular position of disk 26. The spiral shape of pattern 36 also helps to reduce sensitivity of capacitive sensor assembly 28 to tipping of pickup sensor 32 with respect to rotor 30.

In operation, electrical signals $V_1$ and $V_2$, $V_2$ being opposite to $V_1$, are applied to surfaces 35 and 37 respectively. The drive signals are, in this illustrated embodiment, oppositely charged square waves.

Referring particularly to FIG. 3A, a pickoff voltage signal 68 from pickup sensor 32 is connected to the positive input of a high gain amplifier 66, the negative input of which is connected to guard plate 34. Amplifier 66 is confined to have unity gain. The output 58 ($V_{out}$) from the capacitive sensor assembly 28 is characterized by the equation:

$$V_{out} = \frac{C_{13} - C_{23}}{C_{13} + C_{23}} V_1$$

Output 58 is thus independent of the spacing between rotor 30 and pickup sensor 32, except for second order effects due to amplifier input capacitance and fringe fields. The input to amplifier 66, that is pickoff signal 68, is the voltage output from the common terminal of the series connection between capacitor value $C_{13}$ and capacitor value $C_{23}$, resulting in a voltage measuring circuit.

Figure 3B:
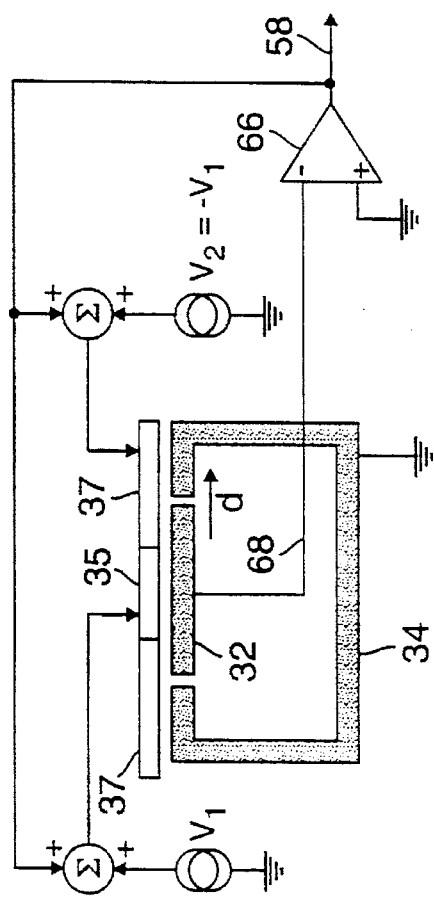
FIG. 3B is a side elevation view of the capacitive sensor assembly of FIG. 3 including an alternative embodiment of the associated electronics.

Referring to FIG. 3B, in another embodiment of capacitive sensor assembly 28, pickoff signal 68 is connected to the negative input of amplifier 66 and the positive input of amplifier 66 is connected to ground. Here, feedback is taken around rotor 30 (that is surfaces 35 and 37). The output 58 of capacitive sensor assembly 28 is again insensitive to spacing between rotor 30 and pickup sensor 32.

Capacitive sensor assembly 28 thus provides, at output 58, an indication of the absolute position of camera 12, negating any need for a power-up search for position. The output of capacitive sensor assembly 28 is used in the electrical control circuit of FIG. 4, and ranges, in this illustrated embodiment, between +/−2.5 V depending upon shaft rotational position. Capacitive sensor assembly 28 is quiet, exhibits low noise, and in view of the fact that it is a non-contact sensing device, provides inherent long life.

Figure 4:
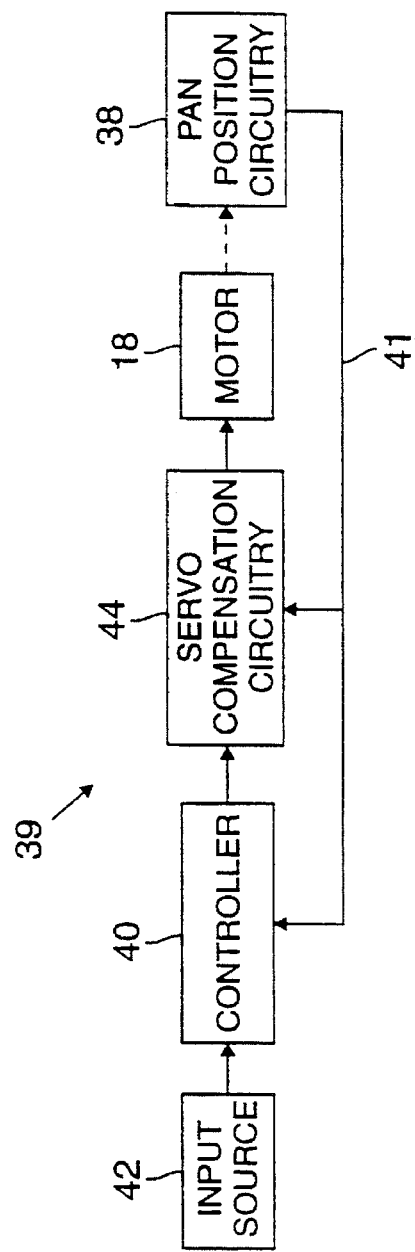
FIG. 4 is an electrical block diagram of the feedback control system of the camera positioning system.

Referring to FIG. 4, an electrical feedback control circuit 39 enables accurate, stable, and repeated control of the rotational pan position of camera 12. In operation of the circuit, the signal over the line from the capacitive sensor assembly 28, representing the pan position of camera 12, is generated by the pan position circuitry 38 and is fed back from circuitry 38 as an input 41 to both a servo compensation circuit 44 and a controller 40. In one embodiment, controller 40 is a model 80C552U14 microcomputer from Philips.

Servo compensation circuitry 44 includes conventional proportional-integral-derivative (PID) servo control which adjusts the signal to motor 18 based upon a comparison of the actual camera position (input 41) with the desired camera position from an input source 42. Input source 42 can be controlled by the user either through an RS232 port or by remote infrared sensing, and can either define a preset position, or can command incremental movement of the camera. The actual camera position (input 41) is also fed back to controller 40 for comparison to the desired camera position to monitor the accuracy of the servo control as a diagnostic means.

Figure 4A:
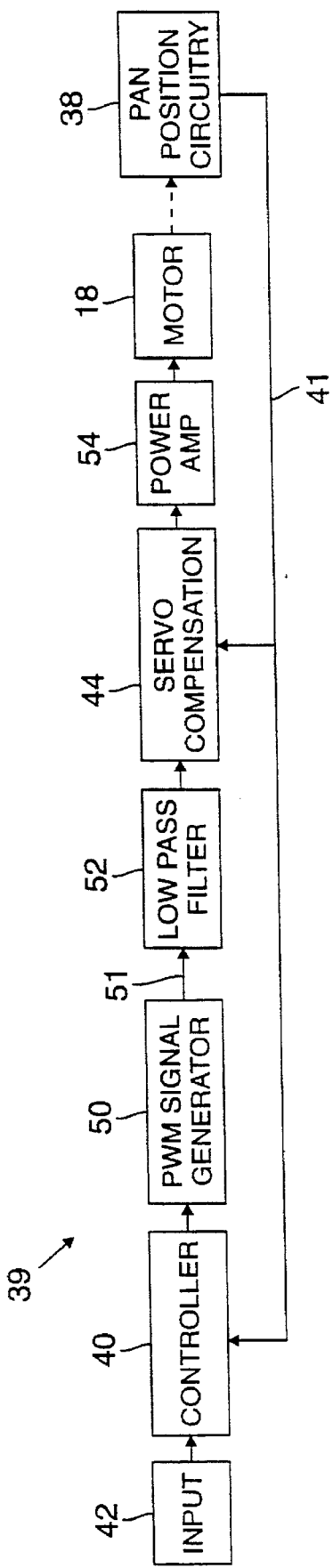
FIG. 4A is a more detailed electrical block diagram of the feedback control system of the camera positioning system.

Referring to FIG. 4A, in which electric feedback control circuit 39 is shown in more detail, a smooth trajectory is generated by circuit 39 for driving motor 18 to move camera 12 to the desired pan position. A logic circuit 50 applies logic signals to the output from controller 40 to create a pulse width modulated (PWM) signal over a line 51 (a 112 Hz, PWM rectangular wave having 14 bit resolution). The PWM signal is fed through a low pass filter 52 before being applied to the servo compensation circuitry 44. The output from servo compensation circuitry 44 is connected through a power amplifier 54 to motor 18 to drive motor 18.

Figure 4B:
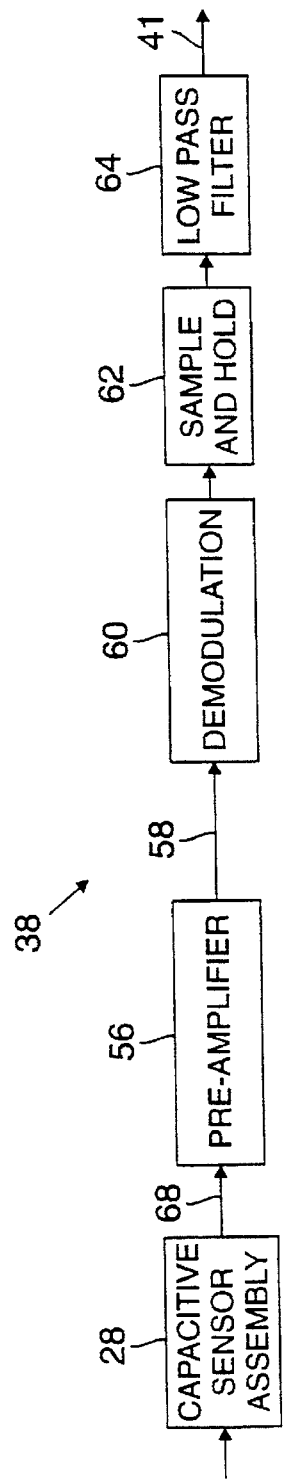
FIG. 4B is a more detailed electrical block diagram of the pan position circuitry of the camera positioning system.

Referring to FIG. 4B, in which pan position circuitry 38 is shown in more detail, the voltage output 58 from capacitive sensor 28 is fed through a preamplifier circuit 56 and the resulting signal on line 58 is demodulated, in a demodulator 60. A sample and hold circuit 62 samples the demodulated output of demodulator 60 to remove transients in the square wave signal; the sampled signal is then fed through a low pass filter 64. The output signal from the low pass filter 64 is the DC signal on line 41 representative of the pan position of camera 12. This is the signal which is fed back to controller 40 and servo-compensation circuitry 44.

Figure 5:
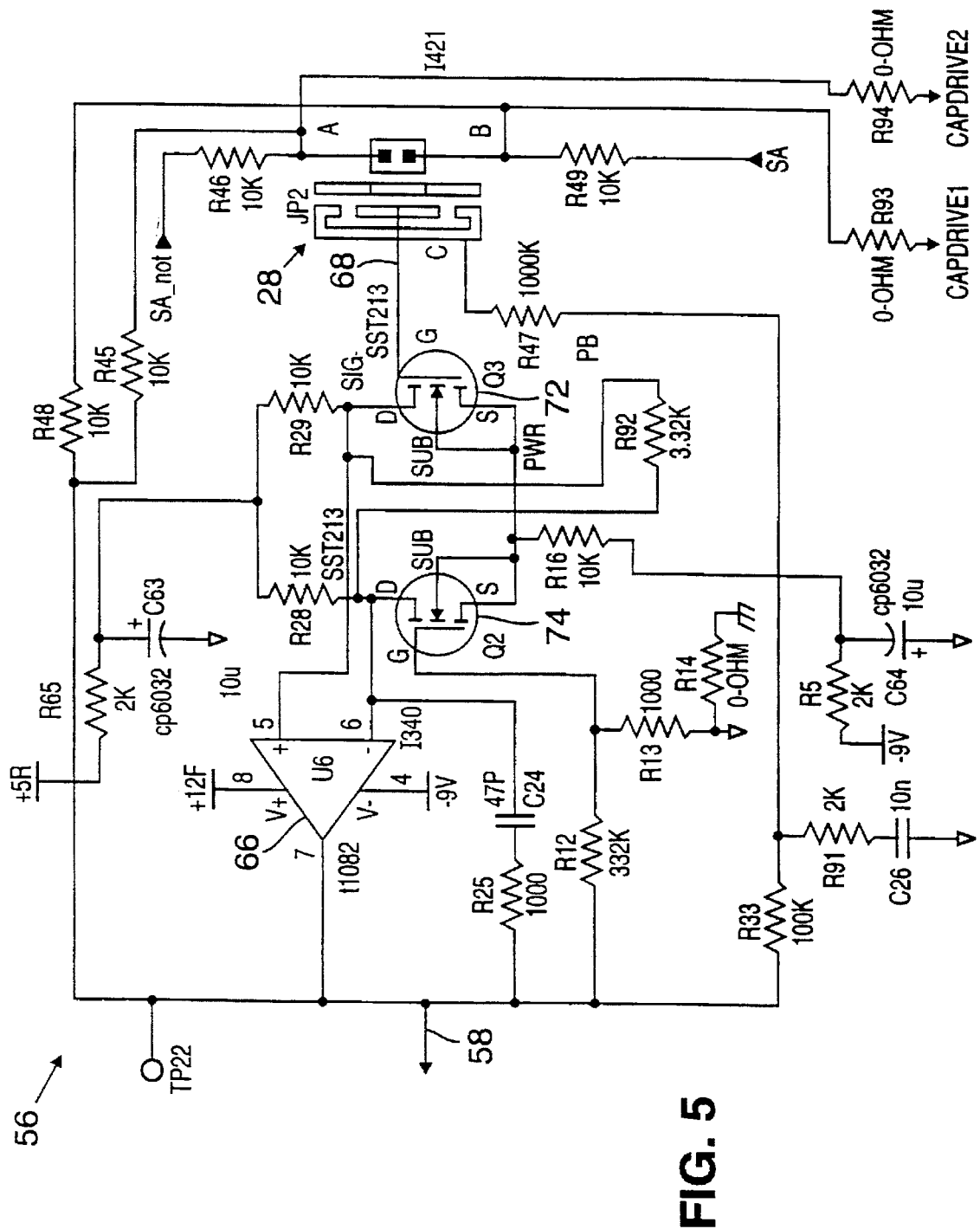
FIG. 5 shows detail of the embodiment of the capacitive sensor assembly associated electronics of FIG. 3A.

Referring to FIGS. 3A and 5, particularly to FIG. 5 in which details of preamplifier circuitry 56 are shown, preamplifier circuitry 56 provides a high impedance, low input capacitance circuit. The pickoff voltage on line 68 is connected to amplifier 66 through discrete field-effect transistors (FET) 72, 74. The discrete FETs provide a high impedance input buffer, completely decoupling the amplifier output from the input, and improve AC parameters like slew rate and gain bandwidth product.

Camera positioning system 10, in the illustrated embodiment, is capable of 180° of pan in 1 sec, 0.5° short term (about one week) repeatability, 1° long term (about one year) repeatability, 0.007° short-term (about one second) stability, and <0.05° motion jitter at slow speeds (about 1°/sec). Motor 18 is preferably a Canon EN33 (about 1 in-oz torque at 5,000 rpm) 12 VDC brushed motor, and can accelerate to full speed in about ¼ second. Manual positioning of camera 12 is allowed, as the friction drive acts as a slip clutch. The 40:1 gear ratio of friction drive assembly 20 provides enough friction to hold the weight of camera 12 when the power is off. The total power required to run camera positioning system 10 can be as low as, for example, 12 Watts peak and 2 Watts steady state.

As noted above, tilt control of camera 12 can be accomplished in a similar manner. The tilt mechanism should be capable of tilting camera 12 through 45° in 1 second. A higher gear ratio, for example, 150:1, is employed for the tilt control mechanism (compared to the pan mechanism) to hold camera 12 in place when the power is off.

In an alternative embodiment of the invention, electrically driven capacitive sensor assemblies can be used to provide feedback to control various components of the camera, for example, capacitive sensors can be used to provide feedback to control the zoom and focus of a camera lens as well as control of the iris to regulate the aperture of the lens.

Additions, subtractions and other modifications of the illustrated embodiments of the invention will be apparent to those practiced in the art and are within the scope of the following claims.

What is claimed is:

1. A camera positioning system for rotating a video camera about at least one rotation axis, comprising:

a camera platform to which said camera is fixedly attached for axial rotation about said axis, a motor mounted to a base, said motor for driving said camera platform to effect rotation of said platform about said axis and relative to said base, a drive for coupling said motor to said camera platform to effect rotation of said platform about said rotation axis, an electrically driven capacitive sensor assembly for generating electrical position signals for determining a rotational position of said camera platform relative to said base, and a feedback control circuit for using said position signals from said capacitive sensor assembly to control rotational positioning of said motor, resulting in rotating said camera to a desired camera position.

2. The camera positioning system of claim 1 wherein said drive is a friction drive comprising a friction drive surface coupled to a friction driven surface, said drive surface being rotatably attached to an output shaft of said motor and said driven surface being attached to said camera platform for movement therewith.

3. The camera positioning system of claim 2 wherein said friction drive surface is a rubber tire having 0.15 inch outer diameter and said driven surface is a disk having a 6 inch outer diameter, for providing a 40:1 gear ratio.

4. The camera positioning system of claim 1 wherein said capacitive sensor assembly comprises a rotor and a pickup sensor mounted in a spaced apart overlapping configuration, one of said rotor or pickup sensor being attached to said camera platform and the other of said rotor or pickup sensor being attached to said base.

5. The camera positioning system of claim 4 wherein said capacitive sensor assembly further comprises a conductive guard plate spaced from said pickup sensor on a side of said pickup sensor opposite to that of said rotor, supported by said base, and which shields said pickup sensor from ground potential and electrical noise.

6. The camera positioning system of claim 4 wherein said rotor is attached to said camera platform and said pickup sensor is attached to said base.

7. The camera positioning system of claim 4 wherein said rotor includes a spiral plate pattern having a first conducting surface and a second conducting surface, the rotational position of said camera platform relative to said base being measured by the amount of overlap between said pickup sensor and each of said conducting surfaces.

8. The camera positioning system of claim 4 wherein the position output from said capacitive sensor assembly is insensitive to spacing between said rotor and said pickup sensor.

9. The camera positioning system of claim 8 wherein said capacitive sensor assembly further comprises a high impedance, low input capacitance circuit.

10. The camera positioning system of claim 9 wherein said capacitance circuit includes two discrete field-effect transistors connected between said pickup sensor and an amplifier.

11. The camera positioning system of claim 10 wherein said capacitance circuit is a voltage measuring circuit.

12. The camera positioning system of claim 4 wherein said capacitive sensor assembly provides an indication of the absolute rotational position of said camera about said axis.

13. The camera positioning system of claim 12 wherein said capacitive sensor assembly tracks the position of said camera over 270 degrees.

14. The camera positioning system of claim 13 wherein said capacitive sensor assembly provides resolution of at least 0.0016 of a degree over 270 degrees.

15. The camera positioning system of claim 1 wherein said system is capable of 180 degrees of pan in 1 second, 0.5 degrees short term repeatability, 1 degree long term repeatability, 0.007 degree short-term stability, and less than 0.05 degree motion jitter at slow speeds.

16. The camera positioning system of claim 1 wherein said rotation axis is horizontal and said camera is rotated to effect pan.

17. The camera positioning system of claim 1 wherein said rotation axis is vertical and said camera is rotated to effect tilt.

18. A camera positioning system for rotating a video camera about a rotation axis, comprising:

a camera platform to which said camera is fixedly attached for axial rotation about said axis, a motor mounted to a base, said motor for driving said camera platform to effect rotation of said platform about said axis and relative to said base, a friction drive for coupling said motor to said camera platform to effect rotation of said platform about said rotation axis, said friction drive comprising a friction drive surface coupled to a friction driven surface, said drive surface being rotatably attached to an output shaft of said motor and said driven surface being attached to said camera platform for movement therewith, an electrically driven capacitive sensor assembly for generating electrical position signals for determining a rotational position of said camera platform relative to said base, said capacitive sensor comprising a rotor and a pickup sensor mounted in a spaced apart overlapping configuration, one of said rotor or pickup sensor being attached to said camera platform and the other of said rotor or pickup sensor being attached to said base, said capacitive sensor further comprising a conductive guard plate spaced from said pickup sensor on a side of said pickup sensor opposite to that of said rotor, supported by said base, and which shields said pickup sensor from ground potential and noise, said rotor including a spiral plate pattern having a first conducting surface and a second conducting surface, the rotational position of said camera platform relative to said base being determined by the amount of overlap between said pickup sensor and each of said conducting surfaces, said capacitive sensor assembly further comprises a high impedance, low input voltage measuring capacitance circuit including two discrete field-effect transistors connected between said pickup sensor and an amplifier, said capacitive sensor providing an indication of the absolute rotational position of said camera about said axis and resolution of at least 0.0016 of a degree over 270 degrees, and a feedback control circuit for using said position signals from said capacitive sensor assembly to control rotational positioning of said motor, resulting in rotating said camera to a desired camera position.

19. A camera positioning system for rotating a video camera about a rotation axis, comprising:

a camera platform to which said camera is fixedly attached for axial rotation about said axis, a motor mounted to a base, said motor for driving said camera platform to effect rotation of said platform about said axis and relative to said base, and a friction drive for coupling said motor to said camera platform to effect rotation of said platform about said rotation axis, said friction drive comprising a friction drive surface coupled to a friction driven surface, said drive surface being rotatably attached to an output shaft of said motor and said driven surface being attached to said camera platform for movement therewith, said friction drive being configured as a slip clutch to allow manual positioning of the video camera.

20. A camera element positioning system for rotating a rotational camera element about an axis, comprising:

a motor for driving said rotational camera element to effect rotation of said rotational camera element about said axis, a drive for coupling said motor to said rotational camera element to effect rotation of said rotational camera element about said axis, an electrically driven capacitive sensor assembly for generating electrical position signals for determining a rotational position of said rotational camera element, and a feedback control circuit for using said position signals from said capacitive sensor assembly to control rotational positioning of said motor, resulting in rotating said rotational camera element to a desired position.

\* \* \* \* \*